United States Patent
Yoshida (10) Patent No.: US 7,223,956 B2
(45) Date of Patent: May 29, 2007

(54) ELECTRONIC IMAGING SYSTEM

(75) Inventor: Hideo Yoshida, Saitama (JP)

(73) Assignee: Fujinon Corporation, Saitama (JP)

( * ) Notice: Subject to any disclaimer, the term of this patent is extended or adjusted under 35 U.S.C. 154(b) by 155 days.

(21) Appl. No.: 11/060,317

(22) Filed: Feb. 18, 2005

(65) Prior Publication Data

US 2005/0178950 A1   Aug. 18, 2005

(30) Foreign Application Priority Data

Feb. 18, 2004   (JP) ............................. 2004-041342

(51) Int. Cl.
*H01L 27/00* (2006.01)
(52) U.S. Cl. .................................. 250/208.1
(58) Field of Classification Search .............. 250/208.1
See application file for complete search history.

(56) References Cited

U.S. PATENT DOCUMENTS

2004/0190085 A1* 9/2004 Silverbrook et al. ........ 358/474
2004/0190092 A1* 9/2004 Silverbrook et al. ........ 358/539
2005/0105785 A1* 5/2005 Shigeta ....................... 382/124
2005/0116041 A1* 6/2005 Zhu et al. ............... 235/462.42

FOREIGN PATENT DOCUMENTS

| JP | 11-133490 | 5/1999 |
| JP | 2002-258363 | 9/2002 |
| JP | 2002-350964 | 12/2002 |
| JP | 2002-359774 | 12/2002 |

* cited by examiner

*Primary Examiner*—John R. Lee
(74) *Attorney, Agent, or Firm*—Young & Thompson (57) ABSTRACT

An electronic imaging system having an image sensor array that includes photodetectors arranged in rows and a rolling shutter for initiating charge integration by row and reading out pixel signals by row after a lapse of a predetermined integration time is equipped with a lighting unit having an LED array including rows of LED elements for producing flashes in different directions, respectively, and a circuitry for exciting and extinguishing the LED rows, one at a time. The LED rows are allocated to a plurality of sections into which the image sensor array is divided, one row to each section. The circuitry initiates excitation of each LED row allocated to a given section of the array at the beginning of charge integration of a first row of the given section and extinguishes the LED row at termination of charge integration of a last row of the given section.

2 Claims, 11 Drawing Sheets

Pattern (1)

P1=(1,1,1)
P2=(1,1,1)
P3=(1,1,1)

Pattern (2)

P1=(0,1,0)
P2=(1,1,1)
P3=(0,1,0)

Pattern (3)

P1=(0,0,0)
P2=(1,1,1)
P3=(0,0,0)

Pattern (4)

Low Shutter Speed

*Fig. 5B*

Moderate Shutter Speed

*Fig. 5C*

High Shutter Speed

Fig. 6A

Low Shutter Speed

Fig. 6B

Moderate Shutter Speed

Fig. 6C

High Shutter Speed

Fig. 7

High Shutter Speed

*Prior Art*

Fig. 11A
*Prior Art*

Low Shutter Speed

Fig. 11B
*Prior Art*

High Shutter Speed

ELECTRONIC IMAGING SYSTEM

BACKGROUND OF THE INVENTION

1. Field of the Invention

The present invention relates to an imaging system and, more specifically, to an electronic imaging system equipped with a sequential exposure rolling shutter.

2. Description of Related Art

Figure 10:
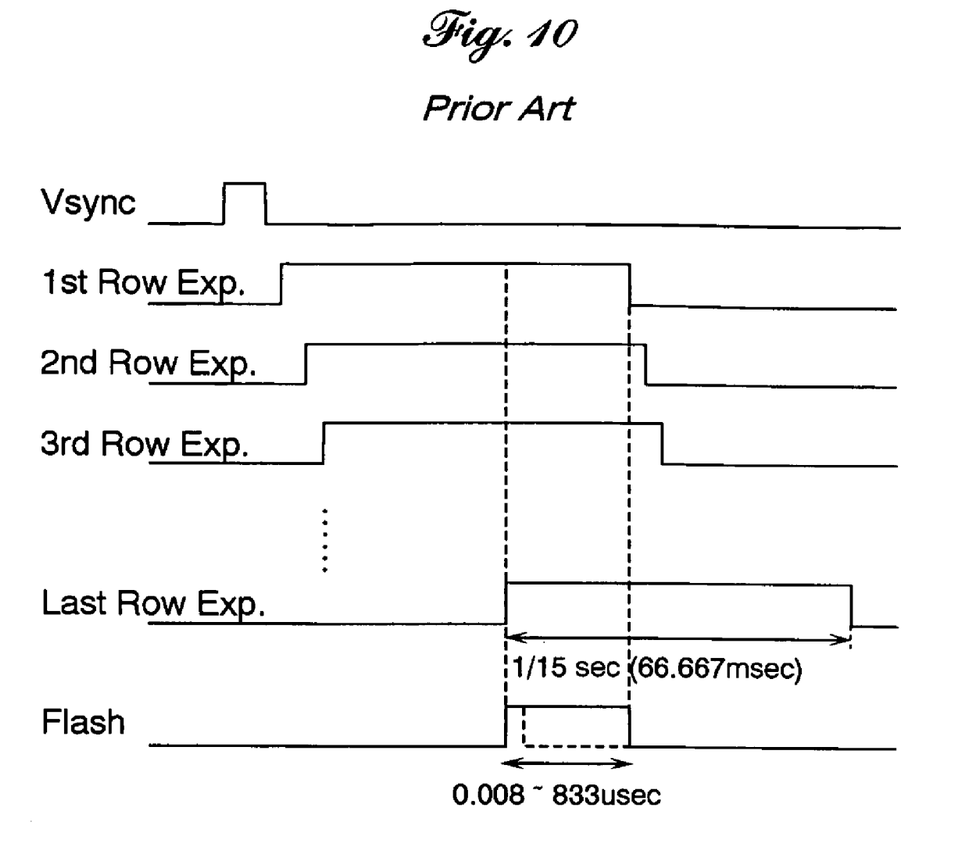
FIG. 10 is a time chart of lighting of a conventional imaging system equipment equipped with a CMOS image sensor device and a built-in-lighting unit.

In recent years, it is a noticeable trend to employ complementary metal-oxide semiconductor (CMOS) image sensor devices for electronically capturing images of subjects in electronic imaging systems in light of the advantages of low cost, small size and low electric power consumption. Such a CMOS image sensor device generally comprises an image sensor array of photodetectors, one for each pixel, arranged in two-dimensional and a rolling electronic shutter or circuitry, in place of a mechanical shutter, for readout of the pixel signals. The photodetector for each pixel in the image sensor array converts photons impinging on the pixel to an electric charge via the photoelectric effect. The charge is integrated over a period of time that is long enough to collect a detectable amount of charge but short enough to avoid saturating storage elements. This period of time is analogous to a film exposure time or shutter speed and is called an integration time. In the image sensor array of the CMOS image sensor device, the integration time is the time between a reset of a given row and a subsequent read of the row. Because only one row can be selected at a time, the reset/read routine is sequentially repeated row by row (sequential exposure control). This sequence is referred to as a "rolling electronic shutter," or simply as a "rolling shutter." As shown in FIG. 10, the rolling shutter accomplishes exposure by sequentially reading succeeding rows, one row at a time, from top to bottom of a frame with certain delays to provide electronic image signals. On the other hand, electronic flash devices are most popular as means for lighting subjects to be photographed Such an electronic flash device is such that, when a high voltage stored in the capacitor is applied to the gas-discharge tube, the gas inside becomes ionized and then a rush of current flows through the gas the tube and it simultaneously emits a bright light by sudden discharge. In general, as shown in FIG. 10, the rolling shutter allows a flash to be generated for an overlapping period of charge integration (exposure) of all the rows of the image sensor array of the CMOS image sensor device for uniform exposure of a flame.

Meanwhile, cellular phones with an image import feature, that have recently been in widespread use, are generally provided with a single white light emitting diode (white LED) built therein as a flash or lighting unit for illuminating subjects to be imported. In general, installation of the single white LED is advantageous to the purpose of space-saving. The cellular phone image import system is designed such that, in the event of importing a picture under, for example, weaker room illumination than daylight, while a first button is kept operated to excite the white LED for illuminate of an aimed subject, a second button is subsequently operated for import of an image of the subject after fixing composition of the image. When the import of the image is completed, the white LED is extinguished.

In the imaging system equipped with a CMOS image sensor device including a rolling shutter, exposure can be made with a plurality of flashes as described in Japanese Unexamined Patent Publication No. 2002-359774. When making exposure using flashes, the exposure may be varied in condition so as to decrease incoming radiation intensity using a desired ND filter as described in Japanese Unexamined Patent Publication No. 2002-350964. The lighting unit that comprises a single white LED element is known in various forms such as a lens-fitted film unit equipped with a lighting unit disclosed, for example, in Japanese Unexamined Patent Publication No. 11-133490. Another example of the lighting unit that is disclosed in Japanese Unexamined Patent Publication No. 11-258363 is such that an LED is excited upon switch-on operation for opening and closing a mechanical shutter and remains excited while the mechanical shutter is kept opened.

Figure 11A:
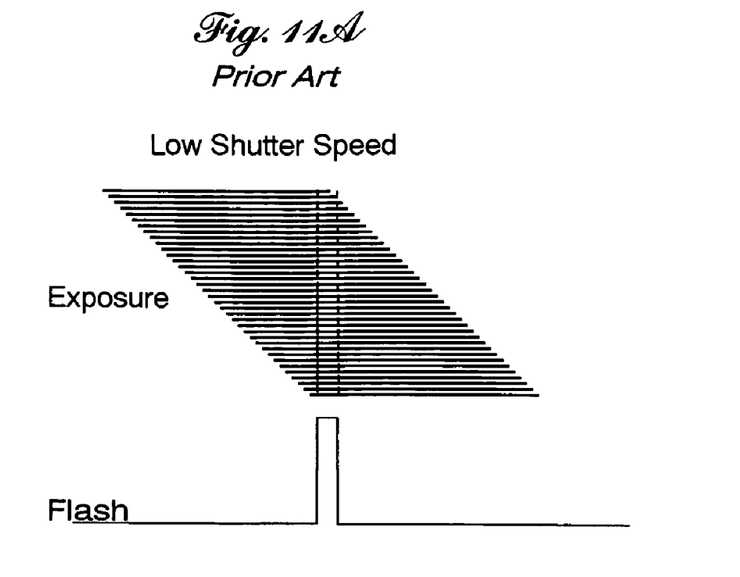
FIGS. 11A and 11B are explanatory charts showing a problem that occurs when the CMOS image sensor device makes exposure at a high shutter speed.
Figure 11B:
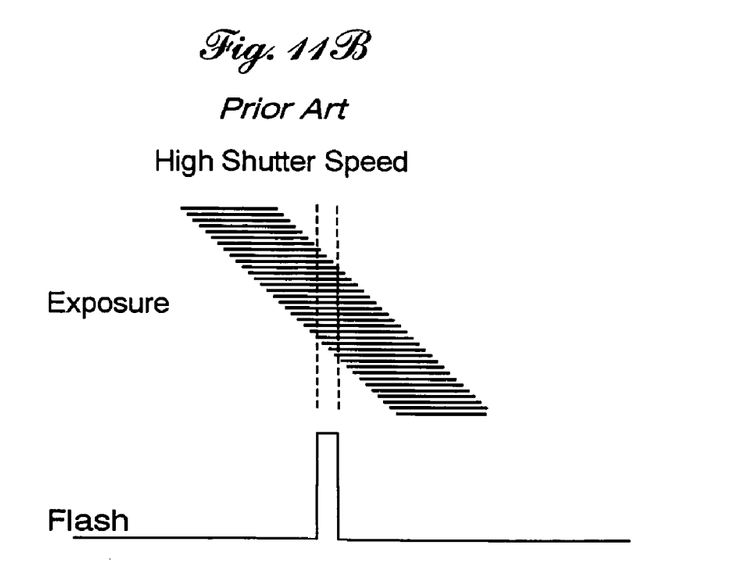

One of the problems that the imaging system equipped with a rolling shutter encounters is that, although flashes can be enabled to affect charge integration (exposure) of all the rows of the image sensor array that overlap one another for a certain period of time when the shutter speed is low as shown in FIG. 11A, a flash is only allowed to affect charge integration (exposure) of some adjacent pixel rows of the image sensor array when the shutter speed is high as shown in FIG. 11B, because it is impossible for the image sensor array that all the rows have periods of charge integration overlapping one another. In consequence, the image sensor array of the CMOS image sensor device causes a difference in exposure between the rows which a flash affects and the rows free of influence of a flash This exposure difference makes speeding up of the rolling shutter of the image CMOS image sensor device.

When designing light and thin, more compact electronic imaging systems with built-in lighting unit, it is more advantageous to employ white LEDs as compared with an electronic flash tube. However, the lighting unit comprising a single white LED element has the problem that light the single white LED element emits is too low in radiation intensity to make correct exposure in a dark scene. It is one approach to a solution of the problem to use a plurality of white LEDs in the lighting unit that are simultaneously excited. However, this simultaneous excitation of white LEDs causes another problem that electric power consumption increases according to the number of excited white LEDs. In particular, in the case where the single white LED is installed in cellular phone having an optical communication feature in addition to the image import feature, even if the white LED can have radiation intensity, the cellular phone will be disabled to make calls or data communication due to a potential drop of batteries resulting from image import and is off from practical use.

Nothing in the above referenced publications is disclosed regarding lighting control of an LED array installed in an electronic imaging system equipped with the sequential exposure rolling shutter. It is impossible to apply the teachings of Japanese Unexamined Patent Publication No. 11-258363 that the lighting control of the LED is made in connection with switch-on operation for opening a mechanical shutter to the imaging system disclosed in Japanese Unexamined Patent Publication No. 2002-359774 that is equipped with a CMOS image sensor device including a rolling shutter. This is because there is an essential distinction of physical structure and exposure mechanism between the mechanical shutter for blanket exposure and the rolling shutter for sequential exposure. Further, there is no suggestion in the referenced publications how to coordinate sequential exposure by the rolling shutter and lighting control of the LED together.

SUMMARY OF THE INVENTION

It is therefore an object of the present invention to provide an electronic imaging system equipped with an image sensor device having a sequential exposure rolling shutter that enables a lighting unit comprising LED elements to produce flashes at a high emission efficiency and a high electric power saving efficiency.

In one aspect of the present invention, the electronic imaging system includes an image sensor array each pixel of which has a photodetector being capable of integrating an electric charge to which photons impinging on the pixel is converted and a rolling electronic shutter for initiating charge integration by row at a predetermined timing and reading out the pixel signals by row at a predetermined timing after a lapse of a predetermined integration timing. The electronic imaging system comprises lighting means having an LED array for producing flashes directed toward a subject in a scene to be electrically captured by the electronic imaging system and lighting control means for initiating excitation of the LED array at a timing of the beginning of charge integration of the image sensor array and extinguishing the LED array at a timing of the termination of the charge integration of the image sensor array.

According to the imaging system thus configured, since the LED array is kept flashing for a period of time between initiation of charge integration of the first row of the image sensor array and termination of charge integration of the last row of the image sensor array, flashes can affect charge integration of all the rows of the image sensor array even at high shutter speeds under which charge integration of all the rows do not overlap one another. Furthermore, the LED array can flash at a higher emission efficiency and a higher electric power saving efficiency as compared with the conventional imaging system which causes the LED element to flash in advance through operation of the first button and then makes exposure through operation of the second button after fixing composition of the image.

In another aspect of the present invention, the electronic imaging system comprises lighting means that includes an LED array having a plurality of LED elements arranged in a plurality of rows allocated to a plurality of sections into which said image sensor array is divided, one row to each section, and lighting control means for consecutively exciting and extinguishing said LED rows, one row at a time, wherein the LED rows produces flashes directed in predetermined directions different from one another so as to illuminate different parts of a scene corresponding to the sections of the image sensor array, respectively, and wherein the lighting control means initiates excitation of each LED row allocated to a given section of the image sensor array at the beginning of charge integration of a first row of the given section and extinguishes the LED row allocated to the given section at termination of charge integration of a last row of the given section.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which.

DETAILED DESCRIPTION OF THE PREFERRED EMBODIMENTS

Figure 1:
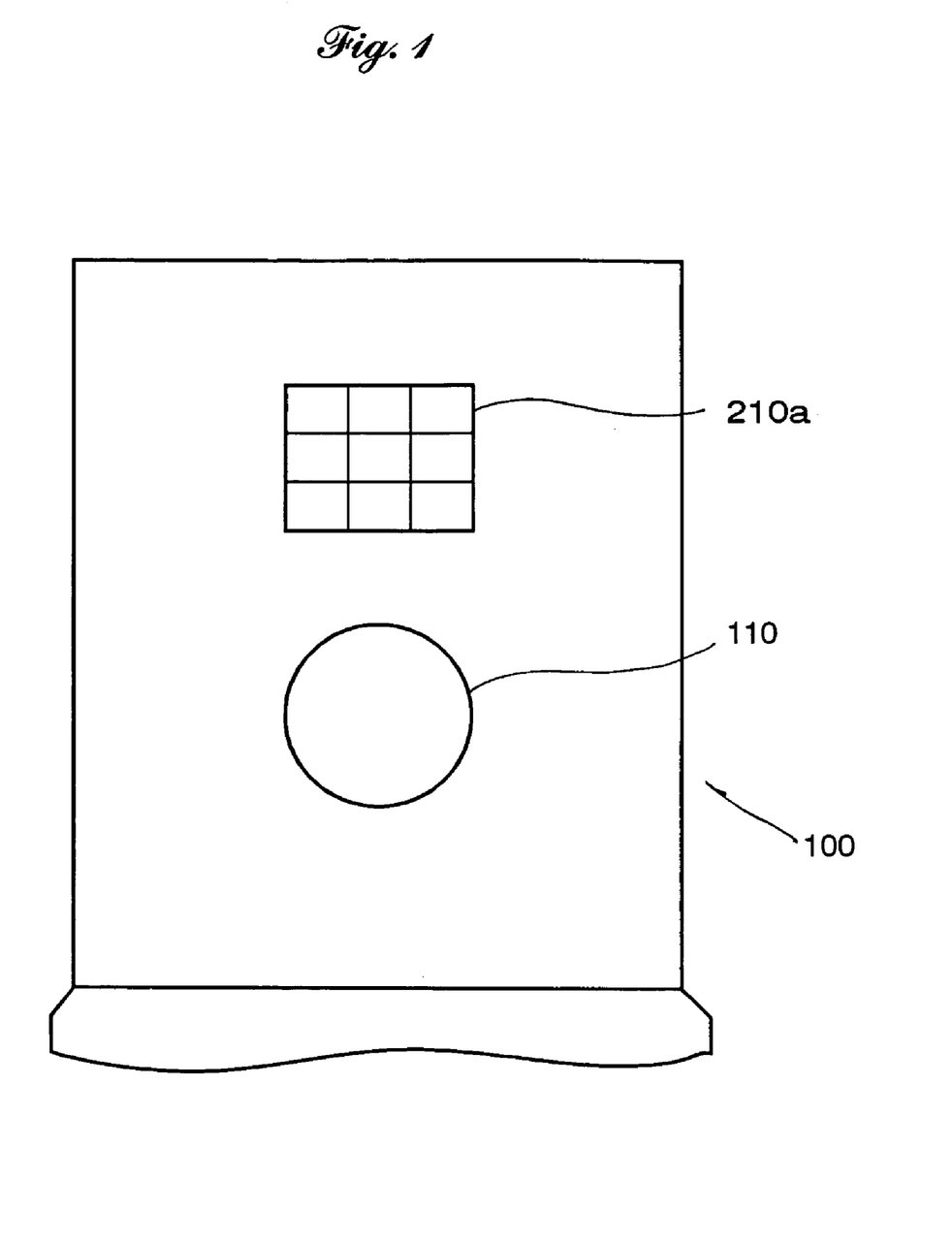
FIG. 1 is a schematic fragmentary view of an external appearance of an imaging system with a taking lens and a lighting unit comprising an LED array according to an embodiment of the present invention.
Figure 2:
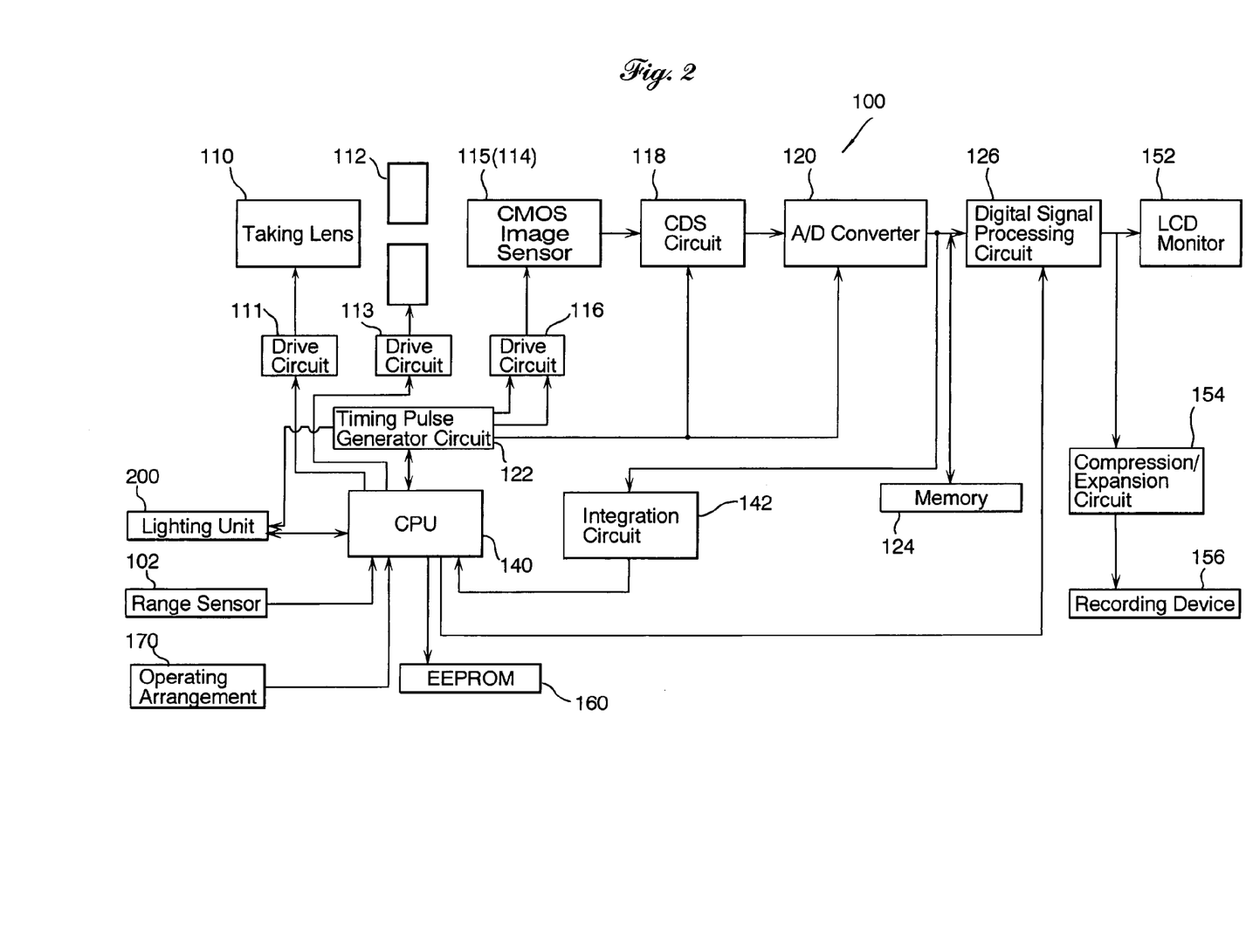
FIG. 2 is a block diagram of an internal structure of the imaging system.

Referring to the accompanying drawings in detail, and in particular, to FIG. 1 schematically showing an electronic imaging system 100, such as a digital still camera, according to an embodiment of the present invention, the imaging system 100 includes a taking lens 110, specifically a zoom lens in this embodiment, and a lighting unit 200 comprising an array of light emitting diodes (which is hereinafter referred to as an LED array) 210a for producing subsidiary flashes which is installed at a side that faces an aimed subject in a scene to be captured. The LED array 210a comprises a number of white LED elements arranged in a plurality of roes. These white LED elements have lighting axes different from one another so as to produce flashes toward different areas of a scene covered by a field of view of the zoom lens 110, respectively. All of the incident light falling on the scene which includes available light indoor illumination light, other ambient light and flashes from the lighting unit 200, is reflected by objects and falls on an image sensor array of a CMOS image sensor device (not shown) through the zoom lens 110. The white LED element is known in various types such as a single chip type comprising a single white LED element and a combination chip type comprising three primary color LED elements, namely red, green and blue LED elements, which emit constituent primary color light, red, green and blue light, respectively. The combination chip LED element can form a wide range of colors according to color temperatures of ambient light by adjusting proportions of light of the three primary colors. When the combination chip LED element produces a beam of light containing a relatively even mixture of light of the three primary colors, it is seen as white. The LED array 210a shown in FIG. 1 by way of example includes, but is not bounded by, nine white LED elements, single chip type or combination type, arranged in three rows, namely in a 3×3 matrix configuration. In the following description, Reference to FIG. 2 showing an internal configuration of the imaging system 100 in the form of digital still camera, the imaging system 100 having the lighting unit 200 and the intake lens 110 comprises a range sensor 102, a lens drive circuit 111, an aperture diaphragm 112, a diaphragm drive circuit 113, a CMOS image sensor device 114 having an image sensor array 115, an image sensor drive circuit 116, a correlation double sampling circuit (CDS circuit) 118, an A/D converter 120, a timing pulse generator circuit 122, a memory 124, a digital signal processing circuit 126, CPU 140, an integrating circuit 142, a liquid crystal device (LCD) monitor 152, a data compression/expansion circuit 154, a recording device 156, EEPROM 160 and an operating arrangement 170 all of which are known in the art All of the incident light falling on a scene, which includes available light, indoor illumination light, other ambient light and artificial light produced by the lighting unit 20 as appropriate, is reflected by objects in the scene and falls on the image sensor allay 115 of the CMOS image sensor device 114 through the zoom lens 110 and the aperture diaphragm 112 to form an optical image on the image sensor array 115. This image sensor array 115 comprises a plurality of pixel rows arranged in a two-dimensional configuration. Each pixel row comprising a large number of photodetectors arranged in a row. The photodetector for each pixel in the image sensor array 115 converts photons impinging thereon to an electric charge in parallel to the intensity of incoming radiation via the photoelectric effect The charge is integrated over a period time. The rows of the image sensor array 115 are reset, one row at a time, from top to bottom to initiate integration of charges and read out as analogue image signals in a timed manner, one row at a time, after a lapse of a predetermined integration time. The timing is controlled by timing pulses applied by the timing pulse generator circuit 122 through the image sensor drive circuit 116. The analog image signals are sampled and held by pixel by the correlation double sampling circuit (CDS circuit) 118 and then converted to digital image signals by the A/D converter 120. The digital image signals are further processed by the digital signal processing circuit 118 after having been stored in the memory 124 once. The image sensor drive circuit 116, CDS circuit 118 and A/D converter 120 are synchronized with a timing pulse from the timing pulse generator circuit 122 so as to output digital image signals in a dot sequential system to the digital signal processing circuit 126.

The digital signal processing circuit 126 converts the digital image signals into the form of simultaneous system from the form of dot sequential system and then into Y and C signals (brightness signals Y and Color difference signals Cr and Cb) after gamma correction and white balance correction. The digital image signals are subsequently sent to and displayed as an image on LCD monitor 152 and, on the other hand, are sent to the data compression/expansion circuit 154 for image data compression on a specified format and thereafter to the recording device 156 for write to a memory medium such as a memory card. When the electronic imaging system 100 is put in a playback mode, the image data is read out from the memory medium and is expanded into digital image signals by the data compression/expansion circuit 154 for display on LCD monitor 152.

The operating arrangement 170 is provided with various manually operable buttons or switches including, but not limited to: a mode switch button for inputting a mode directive indicative of switching over the imaging system 100 among available operational modes including, for example, an exposure mode, a playback mode, an optical communication mode, a macro exposure mode, etc; a zoom button for inputting a zoom directive indicative of a zoom ratio or zoom position; an exposure or shutter button for inputting a preparatory directive indicative of bringing the imaging system 100 into a ready state and consecutively an exposure directive signal indicative of making exposure; and other buttons or switches for inputting various directives as appropriate.

CPU 140 manages overall controls of the imaging system 100 according to incoming directive signals through the manually operable buttons of the operating arrangement 170 and, on the other hand, performs various calculations of automatic control parameters appertaining to automatic focusing (AF), automatic exposure (AE), automatic white balance correction (AWB), etc.

The automatic focusing of the imaging system 100 is performed by depressing the shutter button half-way so as thereby to input a preparatory directive signal into the CPU 140. Upon the half-way depression of the shutter button, the range sensor 102 is instantaneously activated to find a subject distance, then, CPU 140 causes the zoom lens 100, through the lens drive circuit 111, to move automatically to a point where the zoom lens 100 focuses a sharp image of the aimed subject on the image plane of the CMOS image sensor device 114. Thereafter, exposure is made by gently pressing the shutter button all the way down. In the event where the incident light falling on the scene and reflected by an object in the scene is too low in radiant intensity to make correct range finding, the lighting unit 200 may be activated to make pre-lighting for automatic focusing convenience. Another way to make automatic focusing is to use contrast. In this technique, CPU 140 controls the lens drive circuit 111 to move the zoom lens 110 to a point where a high frequency component of a green image signal is maximized.

The automatic exposure begins when depressing the shooting or shutter button half-way. That is, CPU 140 finds an exposure value (EV) according to a subject brightness that is obtained from the incoming radiation intensities of three primary colors (R, G and B) integrated by color by the integrating circuit 142. As well known in the art, a proper combination of a shutter speed and an aperture size is automatically determined on the basis if the exposure value (EV). CPU 140 causes the diaphragm drive circuit 113 to open the aperture diaphragm 112 to the aperture size immediately, and causes the image sensor driver circuit 116 to drive the CMOS image sensor device at a speed equivalent to the shutter speed immediately when pressing the shooting or shutter button all the way down. In the event where the incident light falling on the scene and reflected by an object in the scene is too low in radiant intensity to make correct exposure, the lighting unit 200 is activated to make automatic flush exposure.

The automatic white balance correction is made according to a color temperature. CPU 140 finds three primary color temperatures for a plurality of divisional sections of the image plane of the CMOS image sensor device 114 on the basis of the intensity of the three primary color light respectively integrated by the integrating circuit 142 and calculates values for white balance correction for image signals of the three primary colors. Then, the digital image signals are corrected by color according to the white balance correction values by the digital signal processing circuit 126.

The lighting unit 200 is controlled with various directive signals, such as an excitation pattern directive signal indicating which white LED elements should be excited, an radiant intensity directive signal for adjusting radiant intensity of the white LED elements, an excitation directive signal for excitation of the white LED elements and an extinction directive signal for extinction of the white LED elements, from CPU 140. On the other hand, the lighting unit 200 send various information regarding conditions thereof to CPU 140.

Figure 3:
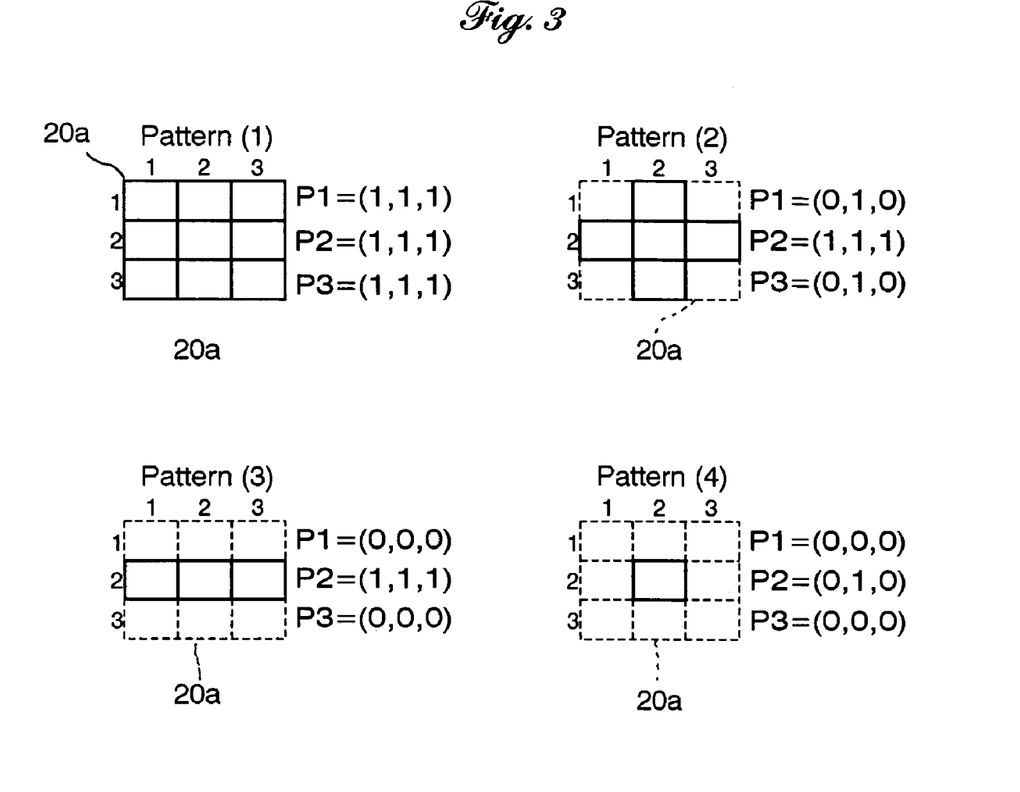
FIG. 3 is an illustration showing selective excitation patterns of a 3×3 LED array.

FIG. 3 shows excitation patterns (1), (2), (3) and (4) of the LED array 210a. CPU 140 provides excitation pattern directive signals P1, P2 and P3 for the respective rows of the LED array 114a, respectively. For example, when the LED array 210a should be excited in the excitation pattern (1), excitation pattern directive signals P1(1, 1, 1), P2(1, 1, 1) and P3(1, 1, 1) are provided so as thereby to excite all the three white LED elements lying in all the three rows. When the LED array 210a should be excited in the excitation pattern (2), excitation pattern directive signals P1(0, 1, 0), P2(1, 1, 1) and P3(0, 1, 0) are provided so as thereby to excite a second column white LED element lying in the first row. In the same manner, when excitation pattern directive signals P1(0, 0, 0), P2(1, 1, 1) and P3(0, 0, 0) are provided, the LED array 210a is excited in the excitation pattern (3) by excitation of all the three white LED elements lying in the second row. When excitation pattern directive signals P1(0, 0, 0), P2(0, 1, 0) and P3(0, 0, 0) are provided, the LED array 210a is excited in the excitation pattern (4) by excitation of a second column white LED element lying in the second row.

Figure 4:
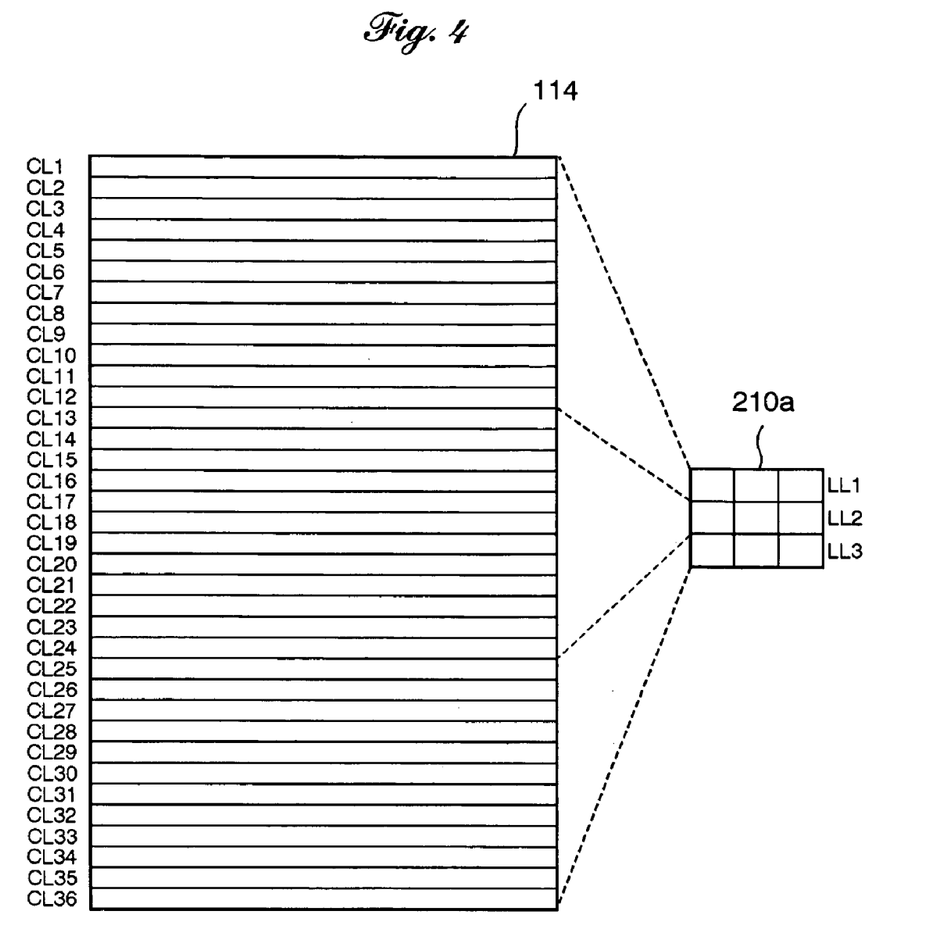
FIG. 4 is an illustration showing allocation of LED rows of the LED array relative to sections an image sensor array of a CMOS image sensor device.

FIG. 4 shows allocation of rows of the LED array 210a of the lighting unit 200 relative to rows of an image sensor array 115 of the CMOS image sensor device 114. As shown, the LED array 210a is separately excited by row so as to make split lighting by allocating one row of the LED array 210a to one of three sections of the image sensor array 115 each of which includes 12 rows, i.e. the first row of the LED array 210a to a first section of the image sensor array 115 consisting of the first to 12th rows, the second row of the LED array 210a to a second section of the image sensor array 115 consisting of the 13th to 24th rows, and the third row of the LED array 210a to a third section of the image sensor array 115 consisting of the 25th to 36th rows. In other words, the lighting unit 200 directs flashes from the first row of the LED array 210a toward a field of view covered by the first to 12th rows of the image sensor array 115, flashes from the second row of the LED array 210a toward a field of view covered by the 13th to 24th rows of the image sensor array 115, and flashes from the third rows of the LED array 210a toward a field of view covered by the 25th to 36th rows of the image sensor array 115.

Figure 5A:
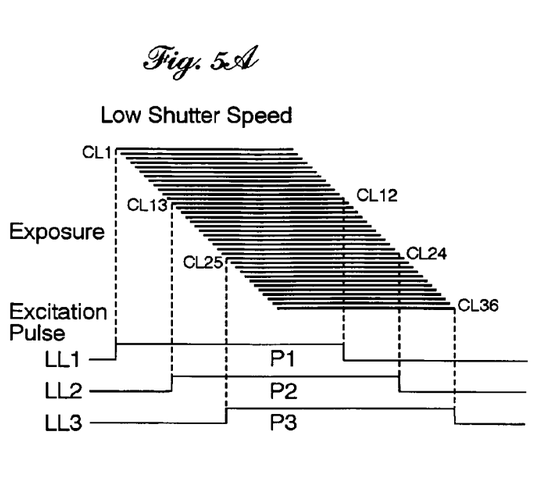
FIGS. 5A, 5B and 5C are time charts showing split-lighting during sequential exposure.
Figure 5B:
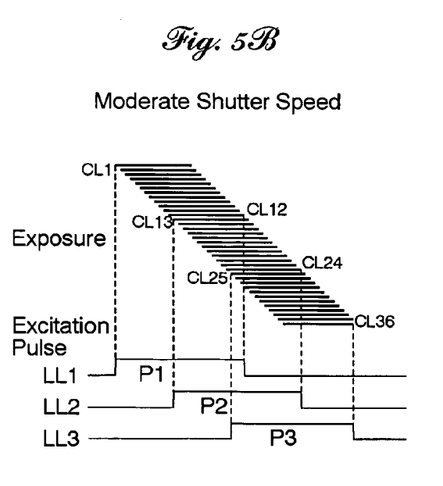
Figure 5C:
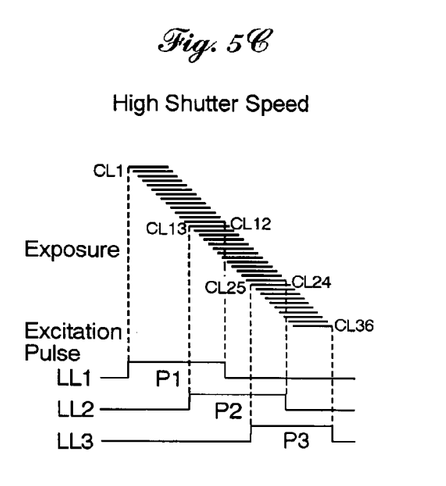

FIGS. 5A, 5B and 5C show split lighting during sequential exposure at a low shutter speed, a moderate shutter speed and a high shutter speed, respectively. The split lighting is performed by exciting all the three white LED elements lying in the respective rows of the LED array 210a in a timed manner. In the respective exposure, the white LED elements laying in the first row are pulsed for excitation at the beginning of charge integration of the first row of pixel array of the CMOS image sensor device 114 and extinction at a lapse of the integration time of the 12th row of pixel array of the CMOS image sensor 114. Consequently, the second row of the LED array 210a is pulsed for excitation at the beginning of charge integration of the 13th row of pixel array of the CMOS image sensor device 114 and extinction at a lapse of the integration time of the 25th row of pixel array of the CMOS image sensor 114, and the third row of the LED array 210a is succeedingly pulsed for excitation at the beginning of charge integration of the 25th row of pixel array of the CMOS image sensor device 114 and extinction at a lapse of the integration time of the 36th row of pixel array of the CMOS image sensor 114.

Figure 6A:
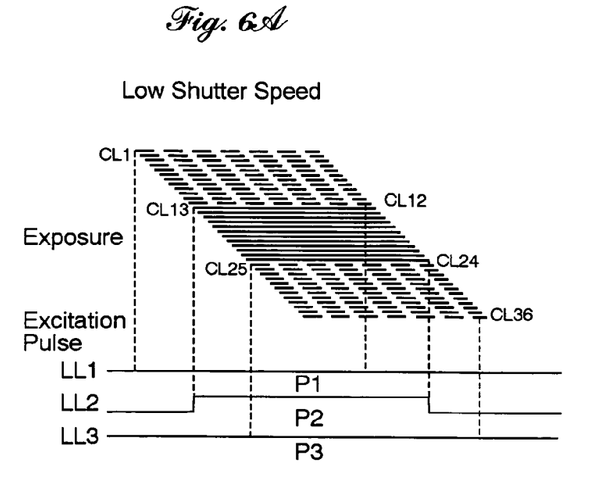
FIGS. 6A, 6B and 6C are time charts showing partial-lighting during sequential exposure.
Figure 6B:
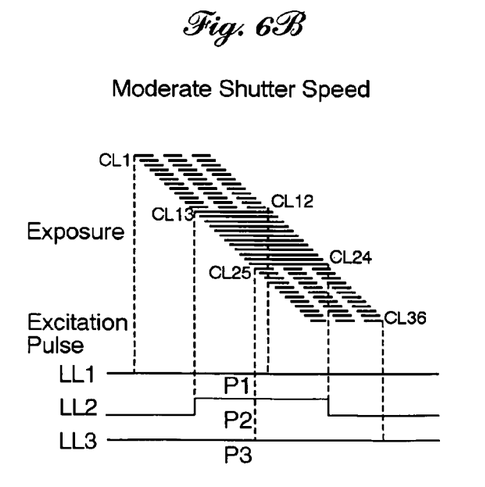
Figure 6C:
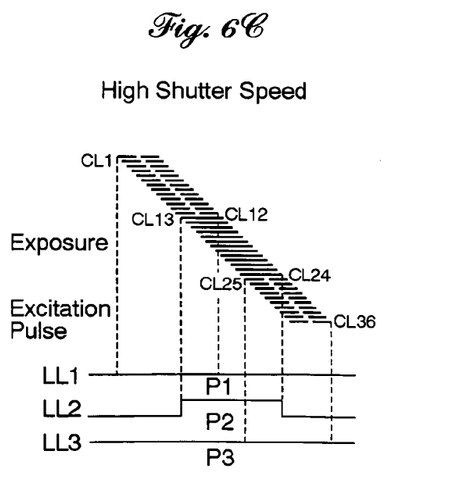

FIGS. 6A, 6B and 6C show partial-lighting during sequential exposure at a low shutter speed, a moderate shutter speed and a high shutter speed, respectively. In the partial lighting during exposure at any shutter speed the LED array 210a is pulsed for excitation in the excitation pattern (4) shown in FIG. 3 at the beginning of charge integration of the 13th row of pixel array of the CMOS image sensor device 114 and extinction at a lapse of the integration time of the 25th row of pixel array of the CMOS image sensor 114. In this instance, the CMOS image sensor 114 does not execute charge integration or a read of the first to 12th rows of pixel array and the 25th to 36th pixel array of CMOS image sensor 114. The partial lighting may be performed by exciting the LED array 210a in the excitation pattern (4) shown in FIG. 3.

Figure 7:
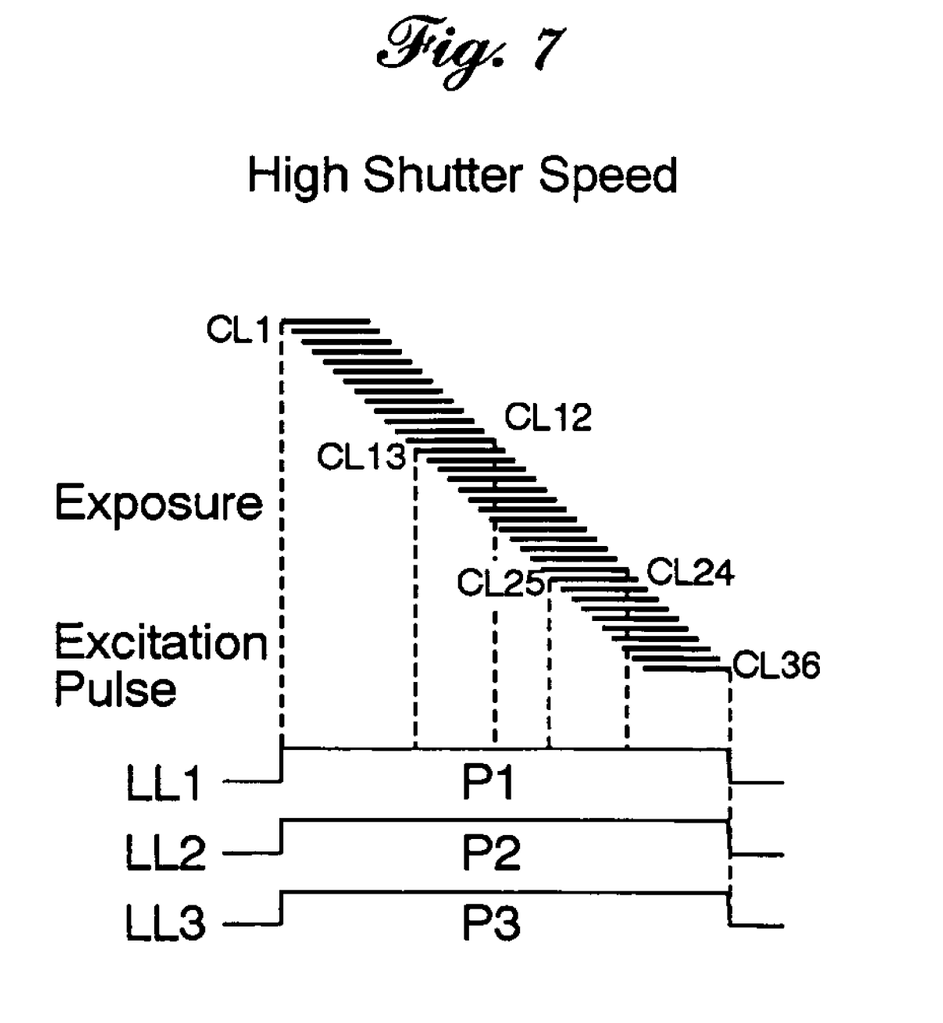
FIG. 7 is a time chart showing blanket-lighting during sequential exposure.

The sequential exposure of the image sensor array 115 of the CMOS image sensor device 114 may take place along with collective-lighting, in place of split-lighting or partial-lighting, as shown in FIG. 7. In the collective-lighting, all the rows of the LED array 210a or 210b are simultaneously excited at the beginning of charge integration of the first row of pixel array (CL1) of the image sensor array 115 and extinguished all at once at a lapse of the integration time of the last row of pixel array (CL36) of the image sensor array 115. The collective-lighting may be executed for exposure at any shutter speeds, even moderate or lower. Alternatively, it is allowed to execute, on one hand, the collective-lighting for exposure at shutter speeds only higher than a predetermined high speed and, on the other hand, to execute the split-lighting for exposure at moderate or lower shutter speeds.

Figure 8:
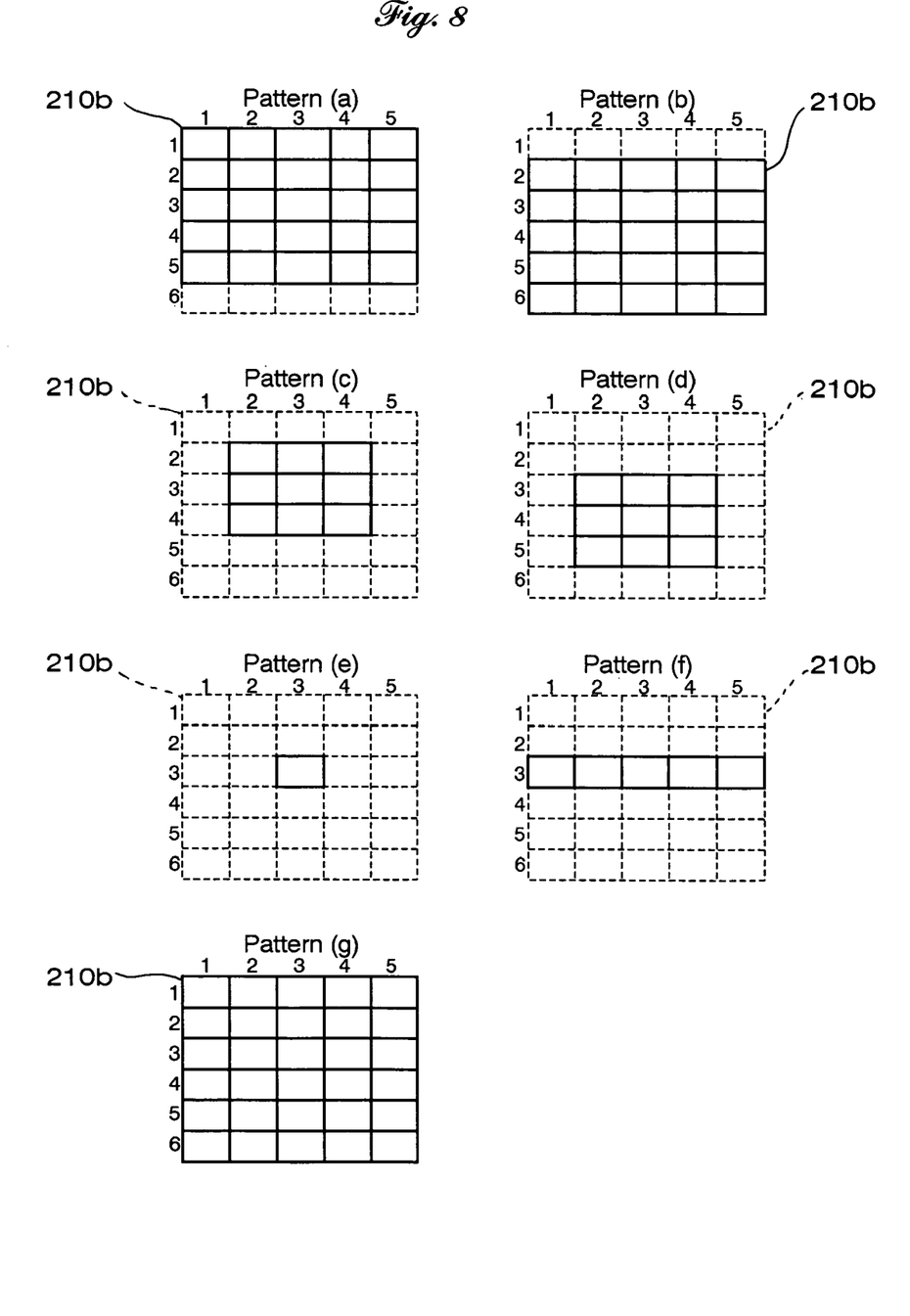
FIG. 8 is an illustration showing selective excitation patterns of a 6×5 LED array.

FIG. 8 shows predetermined excitation patterns (a)–(g) in which an alternative LED array 210b of the lighting unit 200 comprising 30 white LED elements arranged in a 6×5 matrix configuration is selectively excited. The LED array 210b is separately excited by row so as to make split lighting by allocating one row of the LED array 210b to one of six sections of the image sensor array 115 each of which includes 6 rows, i.e. the first row of the LED array 210b to a first section of the image sensor array 115 consisting of the first to sixth rows, the second row of the LED array 210b to a second section of the image sensor array 115 consisting of the seventh to 12th rows, the third row of the LED array 210a to a third section of the image sensor array 115 consisting of the 13th to 18th rows, the fourth row of the LED array 210a to a fourth section of the image sensor array 115 consisting of the 19th to 24th rows, the fifth row of the LED array 210a to a fifth section of the image sensor array 115 consisting of the 25th to 30th rows, the sixth row of the LED array 210a to a sixth section of the image sensor array 115 consisting of the 31st to 36th rows.

The selective excitation of the LED array 210a or 210b is timely made at desired radiant intensity for a desired period of time. CPU 140 provide for the lighting unit 200 various control signals including at least an excitation pattern directive signal, a light intensity directive signal, an excitation directive signal and an extinction directive signal. The predetermined excitation patterns (1)–(4) shown in FIG. 3 or (a)–(g) shown in FIG. 8 are selectively used according to photographic modes and/or operational specificity as described below.

When using the optical zooming feature, which effects zooming by optically varying a zoom ratio of the zoom lens 110 through operation of the zoom button of the operating arrangement 170, the lighting unit 200 is changed in excitation pattern according to the varied zoom ratio so as to fill a scene covered by a field of view of the zoom lens 110 with flashes. CPU 140 provides for the lighting unit 200 am excitation pattern directive signal indicating a specific excitation pattern. For example, when the zoom lens 110 is set to its wide-angle position or wide-angle zoom ratio through operation of the zoom button, CPU 140 provides for the lighting unit 200 an excitation directive signal indicating excitation of all white LED elements lying in the first to fifth rows so as thereby to excite the LED array 210*a* in the excitation pattern (1) shown in FIG. 3 or to excite the LED array 210*b* in the excitation pattern (a) shown in FIG. 8. On the other hand, when the zoom lens 110 is set to its telephoto position or telephoto zoom ratio through operation of the zoom button, CPU 140 provides for the lighting unit 200 an excitation directive signal indicating excitation of all white LED elements but those at four corners, thereby exciting the LED array 210*b* in the excitation pattern (2) shown in FIG. 3 or indicating excitation of the white LED elements lying in the second to forth rows, thereby exciting the LED array 210*b* in the excitation pattern (c) shown in FIG. 8.

When using the electronic zooming feature in which zooming is effected by extracting a desired part of an optical image formed on the image sensor array 115 of the CMOS image sensor device 114, the lighting unit 200 is changed in excitation pattern according to the electronic zoom ratio, namely the ratio of an extraction area relative to a frame of the image sensor array 115 of the CMOS image sensor 114 through operation of the electronic zoom button (or trimming button), so that flashes cover a field from which light impinges on the extraction area of the image sensor array 145. Specifically, when the electronic zoom button is operated to extract a desired part of an optical image on the image sensor array 115 formed by the zoom lens 110 in, for example, the telephoto position, CPU 140 provides for the lighting unit 200 an excitation pattern directive signal for changing the excitation pattern (1) shown in FIG. 3 or the excitation pattern (c) shown in FIG. 8 to the excitation pattern (4) shown in FIG. 3 or the excitation pattern (e) shown in FIG. 8, respectively.

In the case, in particular, where the lighting unit 200 has the LED array 210*b* shown in FIG. 8, it is great instrumental to avoid parallax due to a distance between optical axes of the zoom lens 110 and the LED array 210*b* that changes according to subject distances. CPU 140 provides for the lighting unit 200 an excitation pattern directive signal indicating an excitation pattern suitable for filling a field of view of the zoom lens 110 with flashes irrespective of subject distances. There are various ways of correcting fighting parallax such as, for example, a lighting parallax correction performed through subject distance finding or a lighting parallax correction through operation of the mode switch button. Specifically, the most common practice is to select a desirable one from among the predetermined excitation patterns on the basis of a subject distance found by the range sensor 102. Alternate way is to select a desirable one from among the predetermined excitation patterns in connection with operation of the mode switch button. For example, when the mode switch button is operated to set the electronic imaging system 100 in a macro-photographic mode from a state in which the lighting pattern (c) is appropriately selected, CPU 140 provides for the lighting unit 200 an excitation pattern directive signal for exciting the LED array 210*b* in the excitation pattern (d) in which the white LED elements lying in the third to fifth rows between second and fourth columns are excited.

In the event where the pre-lighting is intended before flash exposure, the lighting unit 200 is controlled so as to excite the LED array 210*a* or 210*b* in specific predetermined excitation patterns according to intended purposes of the pre-lighting. Examples of the pre-lighting purposes includes, but are not limited to, automatic focusing convenience, elimination or alleviation of a red-eye effect and determination of radiant intensity for flash exposure.

In the case where the lighting unit 200 casts flashes for flash exposure by exciting the LED array, for example, in the excitation pattern (a) in FIG. 3 or in FIG. 8, the pre-lighting for automatic focusing is performed by controlling the lighting unit 200 to excite LED array 210*a* in the excitation pattern (3) by exciting all white LED elements lying in the third row as shown in FIG. 3 or the LED array 210*b* in the excitation pattern (f) by exciting all the white LED elements lying in the third row as shown in FIG. 8. In this manner, the pre-lighting pattern for automatic focusing is designed so as to cast flashes at a photometric center of a subject in a scene. Further, the pre-lighting for elimination or alleviation of a red-eye effect is performed by controlling the lighting unit 200 to excite LED array 210*a* in the excitation pattern (3) by exciting all the white LED elements lying in the third row as shown in FIG. 3 or the LED array 210*b* in the excitation pattern (c) by exciting the white LED elements lying in the second to third rows between the second and fourth columns as shown in FIG. 8. In this manner, the pre-lighting pattern for elimination or alleviation of a red-eye effect is designed so as to cast flashes at and around eyes of a person standing in a scene.

The lighting unit 200 has a function of optical communication with external equipment. For optical communication, the lighting unit 200 is controlled to cast flashes in a restricted area. When the mode switch button is operated to set the electronic imaging system 100 to the communication mode, CPU 140 sends the lighting unit 200 an excitation pattern directive signal for exciting only the white LED element at a 2—2 element of the 3×3 matrix (excitation pattern (4) shown in FIG. 3) or at a 3—3 element of the 6×5 matrix (excitation pattern (e) shown in FIG. 8).

The lighting unit 200 is further controlled in radiant intensity for flash exposure or purposive pre-lighting. In the case where exposure is made concurrently with split-lighting as previously described and shown in FIGS. 5A to 5C, if all the LED elements emit light at the same radiant intensity, the image sensor array 114 of the CMOS image sensor device 115 encounters exposure to incoming radiation uneven in intensity by section according to radiant intensity distribution properties of the white LED elements and an overlapping pattern of flashes from, for example, the LED array 210*a* of the lighting unit 200 shown in FIG. 3. Therefore, when the electronic imaging system 100 is in an exposure mode using split-lighting in the excitation pattern (1), CPU 140 provides for the lighting unit 200 an radiant intensity directive signal indicating that the LED array 210*a* should cause the LED elements lying in the second row to emit light at lower radiant intensity than the LED elements lying in the first and third rows. Furthermore, when exciting the LED array 210*a* or 210*b* in a desired predetermined excitation pattern according to effective focal lengths or zoom ratios of the zoom lens 110, the lighting unit 200 is concurrently controlled in radiant intensity according to F-numbers or effective focal lengths of the zoom lens 110.

In the case where the purposive pre-lighting is made, the lighting unit 200 is concurrently controlled in radiant intensity according to purposes of the pre-lighting, namely automatic focusing convenience and elimination or alleviation of a red-eye effect In this instance, appropriate radiant intensity has been recorded in EEPROM 160 by purpose. CPU 140 reads in the radiant intensity for an intended purpose of the pre-lighting from EEPROM 160 and provides the lighting unit 200 a radiant intensity directive signal indicating the radiant intensity so as to excite the LED array to make pre-lighting.

In addition to the excitation and extinction timing control for the split-lighting as was previously described with reference to FIGS. 5A to 5C, the lighting unit 200 is controlled in excitation and extinction timing for the pre-lighting. For the reason that the pre-lighting is generally allowed to be shorter in duration as against lighting for flash exposure, CPU 140 provides the lighting unit 200 excitation and extinction directive signals so that the LED arrays 210a or 210b runs for a duration upon the purposive pre-lighting shorter than upon lighting for flash exposure. This excitation and extinction timing control for the pre-lighting brings about a power saving effect.

Figure 9:
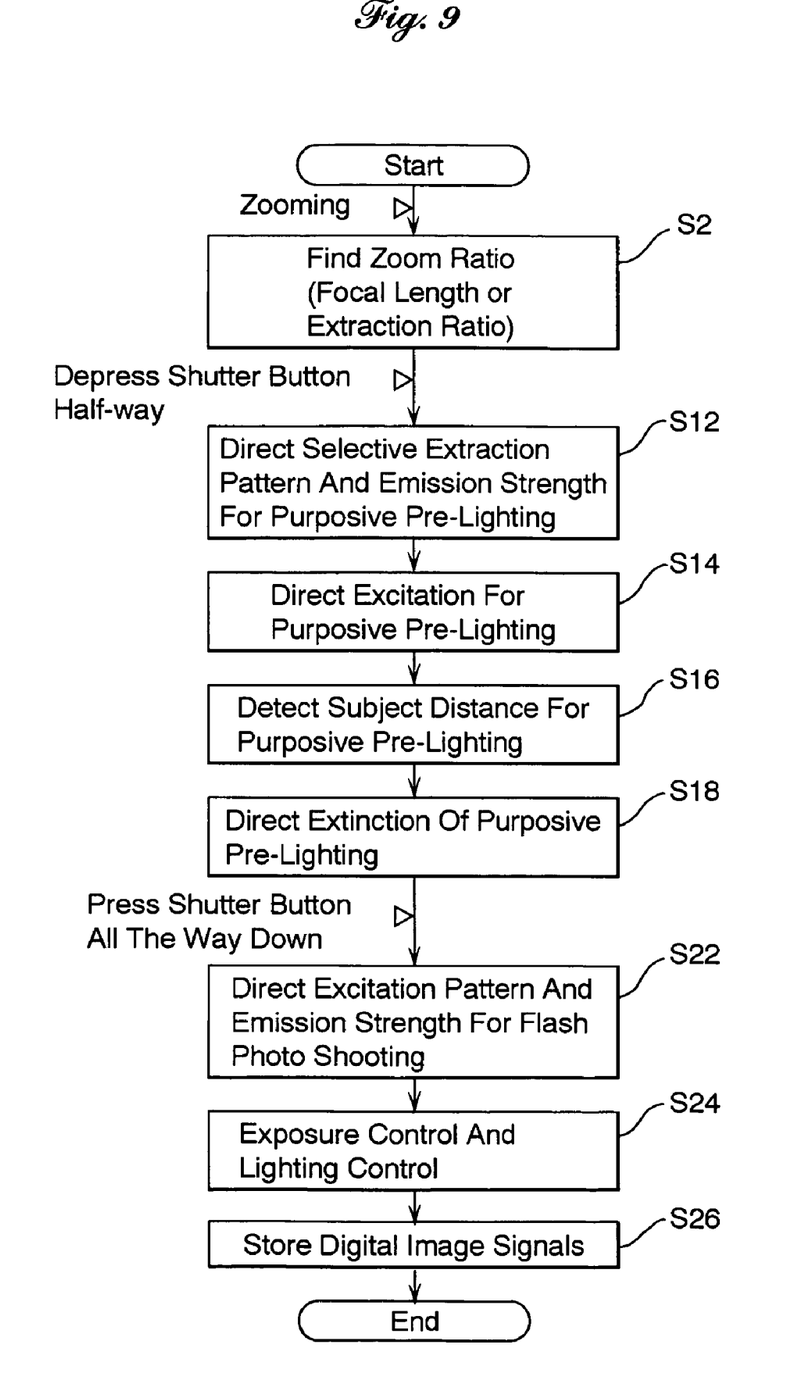
FIG. 9 is a flowchart illustrating an image capturing process of the imaging system.

FIG. 9 is a chart illustrating a photographic process of, for example, taking a still image by the digital still camera 100B shown in FIG. 6. At the beginning of the photographic process, when the zoom button is operated for optical zooming or electronic zooming, CPU 140 finds a zoom ratio, i.e. an effective focal length in the case of optical zooming or a ratio of an extraction or trimming area of the image pickup device 114 on which a desired part of an image falls relative to a given image area of the image pickup device 114 in the case of electronic zooming (step S2). If both optical zooming and electronic zooming are intended, CPU 140 finds these zooming parameters, a focal length and an extraction area. Subsequently, when the shutter button is depressed half-way, CPU 140 provides an excitation pattern directive signal and an emission intensity directive signal for purposive pre-lighting for the lighting unit 200 (step S12) and further an excitation directive signal to excite the lighting unit 200 (step S14) in the event where the subject has need to be lit with subsidiary light for clear focusing. The lighting unit 200 excites white LED elements selected on the basis of the excitation pattern directive signal to light the subject in the lighting pattern (f) shown in FIG. 3 at an intensity prescribed by the emission intensity directive signal. During the pre-lighting, the range sensor 102 detects a subject distance (step S16). Immediately thereafter, CPU 140 provides an extinction directive signal for the lighting unit 200 so as to allow the lighting unit 200 to run for duration of lighting shorter than duration of lighting for flash photo shooting (in step S18). Thereafter, CPU 140 manages to determine an exposure value (EV), to cause the zoom lens 110 to focus automatically on the subject and to correct white balances of digital image signals.

When the shutter button is pressed all the way down, CPU 140 provides for the lighting unit 200 an excitation pattern directive signal and an emission intensity directive signal for flash exposure (step S22). In this instance, the excitation pattern directive signal indicates an excitation pattern determined on the basis of a subject distance and an optical or electrical zoom ratio, and the emission intensity directive signal indicates radiant intensity determined based on a subject distance or an F-number, and radiant intensity distribution properties of the white LED elements and the overlapping pattern of flashes from the white LED elements.

Then, the CMOS image sensor device 114 initiates charge integration of the image sensor array 115 by row and sequentially reads the respective rows of the image sensor arrays 115 at lapses of the integration time, respectively. At this time, CPU 140 pulses the LED array 210a or 210b, directly or through the timing pulse generator circuit 122, in sync with initiation and termination of charge integration of the image sensor array 115 so as to be excited in the directed excitation pattern and to flash at the directed radiant intensity.

In the event where the pre-lighting is called by previously entering a directive for elimination or alleviation of red-eye effect through the operating arrangement 170, the pre-lighting is performed prior to execution of the flash exposure (step S22). After completion of the photographic process including the sequential routine of rolling shutter of the CMOS image sensor device 114 for exposure and synchronous operation of the lighting unit 200 (S24), the digital image signals converted from an optical image by the CMOS image sensor device 114 are temporarily in the memory 124 once (step S26) and, sent to the LCD monitor 152 through the digital signal processing circuit 126 to display an image corresponding to the digital image signals on request and/or sent to the recording device 156 for write to a memory card through the data compression/expansion circuit 154 on request Although the present invention has been described in conjunction with a digital camera by way of embodiment, it is embodied in various electronic imaging systems including digital video cameras and cellular phones having image entry features. Further, various other embodiments and variants may occur to those skilled in the art, which are within the scope and spirit of the invention, and such other embodiments and variants are intended to be covered by the following claims.

What is claimed is:

1. An electronic imaging system for electronically capturing images that comprises an image sensor array having photodetectors arranged in the form of a plurality of pixel rows comprising plural pixels, said photodetector for each pixel being capable of integrating an electric charge to which photons impinging on the pixel is converted to provide a pixel signal, and a rolling electronic shutter for initiating charge integration by row at a predetermined timing and reading out the pixel signals by row at a predetermined timing after a lapse of a predetermined integration timing, said imaging system comprising:

lighting means comprising an LED array for producing flashes so as to illuminate toward a subject in a scene to be electrically captured by said electronic imaging system; and lighting control means for initiating excitation of said LED array at a timing of the beginning of charge integration of said image sensor array and extinguishing said LED array at a timing a termination of said charge integration of said image sensor array.

2. An electronic imaging system for electronically capturing images that comprises an image sensor array having photodetectors arranged in the form of a plurality of pixel rows comprising plural pixels, said photodetector for each pixel being capable of integrating an electric charge to which photons impinging on the pixel is converted to provide a pixel signal, and a rolling electronic shutter for initiating charge integration by row at a predetermined timing and reading out the pixel signal by row at a predetermined timing after a lapse of a predetermined integration time, said imaging system comprising:

lighting means comprising an LED array having a plurality of LED elements arranged in a plurality of rows for producing flashes in predetermined directions, respectively, different from one another so as to illuminate a scene to be electrically captured by said electronic imaging system; and lighting control means for consecutively exciting and extinguishing said LED rows, one row at a time;

wherein said LED rows are allocated to a plurality of sections into which said image sensor array is divided, one row to each section, and said lighting control means initiates excitation of each said LED row allocated to a given section of said image sensor array at the beginning of charge integration of a first row of said given section and extinguishes said LED row allocated to said given section at termination of charge integration of a last row of said given section.

* * * * *